US006324511B1

United States Patent
Kiraly et al.

(10) Patent No.: US 6,324,511 B1
(45) Date of Patent: Nov. 27, 2001

(54) METHOD OF AND APPARATUS FOR MULTI-MODAL INFORMATION PRESENTATION TO COMPUTER USERS WITH DYSLEXIA, READING DISABILITIES OR VISUAL IMPAIRMENT

(75) Inventors: Jozsef Kiraly, San Martin; Peter M. Ridge, San Jose, both of CA (US)

(73) Assignee: Mindmaker, Inc., San Jose, CA (US)

( * ) Notice: Subject to any disclaimer, the term of this patent is extended or adjusted under 35 U.S.C. 154(b) by 0 days.

(21) Appl. No.: 09/164,897

(22) Filed: Oct. 1, 1998

(51) Int. Cl.$^7$ .................................................. G10L 13/08
(52) U.S. Cl. ........................... 704/260; 704/270; 704/271
(58) Field of Search ................................ 704/260, 271, 704/270

(56) References Cited

U.S. PATENT DOCUMENTS

| 4,695,975 | * | 9/1987 | Bedrij .................................... 345/302 |
| 5,561,736 | * | 10/1996 | Moore et al. ......................... 704/206 |
| 5,715,412 | | 2/1998 | Artsuka et al. ....................... 395/326 |
| 5,943,648 | * | 8/1999 | Tel ........................................ 704/260 |

FOREIGN PATENT DOCUMENTS

| 0655696 A1 | 5/1995 | (EP) | ............................... G06F/17/30 |
| 0834853 A2 | 4/1998 | (EP) | ............................... G09B/21/00 |
| 0848373 A2 | 6/1998 | (EP) | ............................... G10L/5/04 |
| 93/03453 | 2/1993 | (WO) | ............................... G06F/15/72 |
| 97/09704 | 3/1997 | (WO) | ............................... G09B/17/04 |

OTHER PUBLICATIONS

Ai–Squared "Xtra! ZoomText: User's guides version 6.1" 1997, pp. 85–89, 97, 100 and 118.*
Moseley et al "Measuring Microsoft office 97" Sybex, p. 170.*
Ai–Squared "Xtra! ZoomText: User's guides Version 6.1" 1997, p. 105.*
Kline, R.L. et al, "Improving GUI Accessibility for People with Low Vision", Human Factors in Computing Systems, CHI '95 Conference Proceedings, Denver, May 7–11, 1995, pp. 114–121.

(List continued on next page.)

Primary Examiner—William R. Korzuch
Assistant Examiner—Vijay B Chawan
(74) Attorney, Agent, or Firm—Wagner, Murabito & HaoLLP

(57) ABSTRACT

A method of providing language assistance to a computer user with dyslexia, reading disabilities or visual impairment by presenting text-based information via multiple media channels. The method of the present invention includes the steps of: accessing a source of text-based data that can originate from a computer text document, displaying text-based data in a text window with a standard font size, displaying the text-based data in another text window with a magnified font size, sequentially highlighting the text-based data in the magnified text window one word at a time; generating synthesized speech signals representative of the highlighted text; rendering the synthesized speech signals audible synchronously with the displaying of the highlighted text; displaying images that correspond to the context of the highlighted text; and generating sound effects that are pertinent to the context of the highlighted text such that text-based information and corresponding graphical and audible information can be perceived simultaneously by the user. This technique effectively provides multiple channels of information to a user. The present invention is particularly useful for displaying text-based information to users having reading disabilities such as dyslexia, or for increasing the entertainment value of viewing a text document. The present invention may be used for assisting users in editing documents and in retrieving information from the World Wide Web.

30 Claims, 8 Drawing Sheets

OTHER PUBLICATIONS

Mereu S.W. et al., "Audio Enhanced 3D Interfaces for Visually Impaired Users", Common Ground, CHI "96 Conference Proceedings, Conference on Human Factors In Computing Systems Vancouver, Apr. 13–18, 1996, pp. 72–78.

Raman, T.V., "Emacspeak–A Speech Interface", Common Ground. CHI '96 Conference Proceedings, Conference on Human Factors in Computing Systems Vancouver, Apr. 13–18, 1996, pp. 66–71.

* cited by examiner

METHOD OF AND APPARATUS FOR MULTI-MODAL INFORMATION PRESENTATION TO COMPUTER USERS WITH DYSLEXIA, READING DISABILITIES OR VISUAL IMPAIRMENT

FIELD OF THE INVENTION

The present invention generally relates to the field of computer systems. More specifically, the present invention relates to the field of computer aided systems for computer users with dyslexia, reading disabilities, or visual impairment.

BACKGROUND OF THE INVENTION

Development in software technology has allowed computers to perform a wide variety of useful operations. Depending on the software which is installed within their particular memory storage devices, computers can be used to manage numerous financial transactions of a bank, control the fabrication of items ranging from automobiles down to integrated circuit chips, store addresses and telephone numbers of acquaintances, analyze scientific and engineering data, produce and edit documents, along with transmitting and receiving data.

The World Wide Web (also called the "Web") has also been made possible by recent advances in hardware and software technology. By way of background, the World Wide Web is an internet facility that links documents locally and remotely. A Web document is called a Web page, and hyper-links in the page allow users to "jump" from page to page whether the pages are stored on the same server or on other servers around the world. Since its genesis in the late 1980's, the Web has become extremely popular. Millions and millions of Web pages are now available on the Web, and millions of people access those Web pages daily. One of the primary reasons for the Web's success is that, Web pages, containing both text and graphics, are probably the largest collection of on-line information known to humankind. And, that vast amount of information is easily accessible via a Web browser such as Netscape® Navigator™ or Microsoft® Internet Explorer™.

However, not everyone is able to realize the full potential of computer systems or the World Wide Web. For instance, a person with certain reading or comprehension dysfunctions, e.g. dyslexia, may find producing and editing a document on a computer difficult because he/she may not be able to comprehend information that is presented only in the form of text. Moreover, for those who suffer from visual impairments like acute myopia, surfing the World Wide Web and comprehending information therefrom can also present a significant challenge. First of all, Web pages contain mainly text data. Even search engines, such as Excite, Lycos, or AltaVista, which are indispensable when searching for specific information on the Web, are text-based. Secondly, the font sizes and colors of the Web pages are usually predetermined by the owners of the Web pages. Therefore, a person suffering from a reading disability may have difficulty understanding those Web pages or a person suffering from visibility problems may have problems viewing those Web pages. Thus, most people who suffer from dyslexia, other reading disabilities or visual impairments can become discouraged from using computer systems and the World Wide Web for these reasons.

Furthermore, a number of other non-Web based software exists that routinely presents textual information to users, e.g. word processor, multimedia applications, electronic spread sheets, etc. Persons with reading or comprehension dysfunctions can also become discouraged from using these software. It would be desirable to provide a system that increases the ease-of use of these word processor and multimedia applications. Additionally, as computers become more and more popular in the home and in classrooms, small children are becoming more accustomed to using computer systems and computer programs. It would also be desirable to provide a system that increases the viewing enjoyment and comprehension of the children with respect to the text-based information of a computer program.

Therefore, what is needed is a method of and apparatus for providing text assistance to computer users who are dyslexic, have other reading disabilities or are visually impaired. What is further needed is a method of and apparatus for presenting text-based information to dyslexic, reading disabled or visually impaired computer users during text-editing or Web-browsing. What is yet further needed is a method of and an apparatus for communicating text-based information to computer users, especially younger users, in an easily comprehensible manner that is entertaining.

SUMMARY OF THE DISCLOSURE

The present invention provides for a method of assisting computer users in comprehending and understanding text-based information by simultaneously reinforcing the information via multiple media channels. Particularly, the method of the present invention is implemented in a computer system or embodied in a computer-usable medium in the form of a computer program, and includes the steps of: accessing a source of text-based data, displaying text-based data in a text window with a standard font and size, and/or displaying a portion of the text-based data in another text window with a magnified font and size, sequentially highlighting the text-based data in one or both text windows one word at a time; and generating synthesized speech signals representative of the highlighted word and rendering the synthesized speech signals audible synchronously with the displaying of the highlighted text such that text-based information and corresponding audible information can be perceived simultaneously by the user. The present invention is particularly useful for displaying text-based information to users having reading disabilities such as dyslexia as the simultaneous reinforcement of the audio and visual information renders the text-based data easily comprehensible. The present invention may also be used for assisting users with visual impairments in document editing and retrieving information from the World Wide Web. The present invention can yet be employed to increase the comprehension of and entertainment value of text-based information as displayed to computer users, especially young computer users.

In furtherance of one embodiment of the present invention, the method further includes the steps of: providing a third window for displaying graphic images, and displaying an image depicting the text-based data synchronously with the displaying and highlighting of the text-based data. In this embodiment, a configuration file is used to store a list of keywords or key phrases and the names of the images associated with the keywords or key phrases and to be displayed when the keywords or key phrases are encountered. In another embodiment, an animated sequence depicting the text-based data is displayed synchronously with the displaying and highlighting of the text-based data. In yet another embodiment, audio or sound effects depicting the text-based data are audibly generated synchronously with the displaying and highlighting of the text-based data.

According to another embodiment of the present invention, characteristics of synthesized speech signals are context-sensitive. In one embodiment, in conjunction with the displaying of text-based data, the characteristics of synthesized speech, such as pitch, inflection, volume, tone, and speed, vary according to the context of the text-based data that is being electronically enunciated. In this way, the present invention is capable of conveying the emotional content of the text-based data that is being displayed and read aloud to the user. It is appreciated that the text based voice synthesis and imagery as described above can be made word or phrase sensitive.

In another embodiment of the present invention, the method further comprises the step of providing a control interface for allowing the user to customize parameters of the present invention, such as the size of the font, the color of the highlighting, the volume, tone, speed, etc., of the synthesized speech, etc. In addition, the control interface may allow the user to change the method of highlighting to underlining or bold-facing to suit the user's personal taste and preference.

Embodiments of the present invention include the above and further include a method of displaying information to a user comprising the computer implemented steps of: accessing a source of text-based data, displaying a portion of the text-based data in a text window displayed on a display screen of the computer system, sequentially marking a section of the text-based data one section at a time; and synchronous with the step of marking, displaying an imagery representative of the marked section of text-based data in another window on the display screen, generating synthesized speech signals representative of the marked section of text-based data, rendering the speech signals audible, and rendering audio information or sound effects audible so that text-based information, graphics information and audible verbal and sound effects information are delivered to the user simultaneously.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description, for purposes of explanation, numerous specific details are set forth in order to provide a thorough understanding of the present invention. It will be apparent, however, to one skilled in the art, upon reading this disclosure, that the present invention may be practiced without these specific details. In other instances, well-known structures and devices are not described in detail in order to avoid obscuring aspects of the present invention.

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here and generally conceived to be a self-consistent sequence of steps of instructions leading to a desired result. The steps are those requiring physical manipulations of data representing physical quantities to achieve tangible and useful results. It has proven convenient at times, principally for reasons of common usage, to refer to these signals as bits, values, elements, symbols, characters, terms, numbers or the like.

Unless specifically stated otherwise as apparent from the following discussions, it is appreciated that throughout the present invention, discussions utilizing terms such as "receiving", "determining", "generating", "associating", "assigning" or the like, refer to the actions and processes of a computer system, or similar electronic computing device. The computer system or similar electronic device manipulates and transforms data represented as electronic quantities within the computer system's registers and memories into other data similarly represented as physical quantities within the computer system memories into other data similarly represented as physical quantities within the computer system memories or registers or other such information storage, transmission, or display devices.

Computer System Environment of the Present Invention

Figure 1:
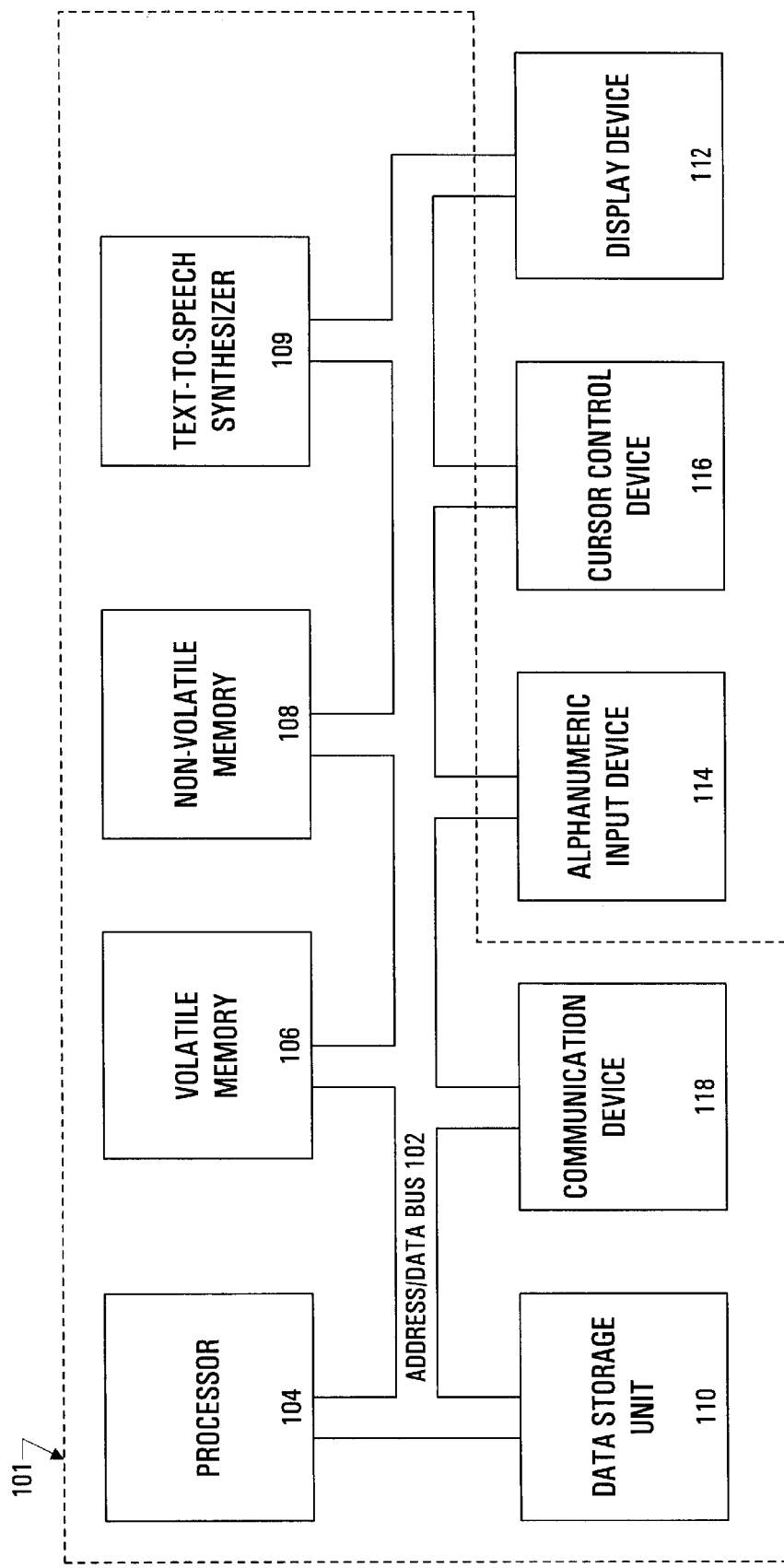
FIG. 1 is a block diagram illustrating an exemplary general purpose computer system in which different embodiments of the present invention can be implemented.

Aspects of the present invention, described below, are discussed in terms of steps executed on a computer system. Although a variety of different computer systems can be used with the present invention, an exemplary computer system platform 101 is shown in FIG. 1.

In general, computer systems 101 that can be used by the present invention include an address/data bus 102 for communicating information, a central processor 104 coupled with bus 102 for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 101 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Computer readable memory units of system 101 include 106, 108 and 110. Computer system 101 also includes a text-to-speech synthesis device 109 for voice communication from the computer system 101 to the user. The text-to-speech synthesis device 109 is coupled to bus 102 for receiving information from the processor 104, and can be implemented as either a hardware circuit unit, and/or can be implemented using software.

Computer system 101 may further include a communication device 118 (e.g., a modem, or a network interface card NIC) coupled to the bus 102 for interfacing with other computer systems or the Internet. Also included in computer system 101 of FIG. 1 is an optional alphanumeric input device 114 including alphanumeric and function keys coupled to the bus 102 for communicating information and command selections to the central processor 104. Computer system 101 also includes an optional cursor control or directing device 116 coupled to the bus 102 for communicating user input information and command selections to the central processor 104. An optional display device 112 can also be coupled to the bus 102 for displaying information to the computer user. Display device 112 may be a liquid crystal device, other flat panel display, cathode ray tube, or other display device suitable for creating graphic images and alphanumeric characters recognizable to the user. Cursor control device 116 allows the computer user to dynamically signal the two dimensional movement of a visible symbol (cursor) on a display screen of display device 112. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

Text-reader Software useful for Dyslexics and the Visually Impaired According to the Present Invention The present invention provides for a method of providing text assistance to a computer user with dyslexia, reading disabilities, or visual impairment by presenting text-based information to the computer user via multiple media channels. The method of the present invention may be implemented in a computer system or embodied in a computer-usable medium in the form of software programs. In one particular embodiment, the method of the present invention is embodied in a text-reader software. It should be appreciated that the text-reader software can be implemented using a common computer programming language such as C, C++ or Java™.

Figure 2:
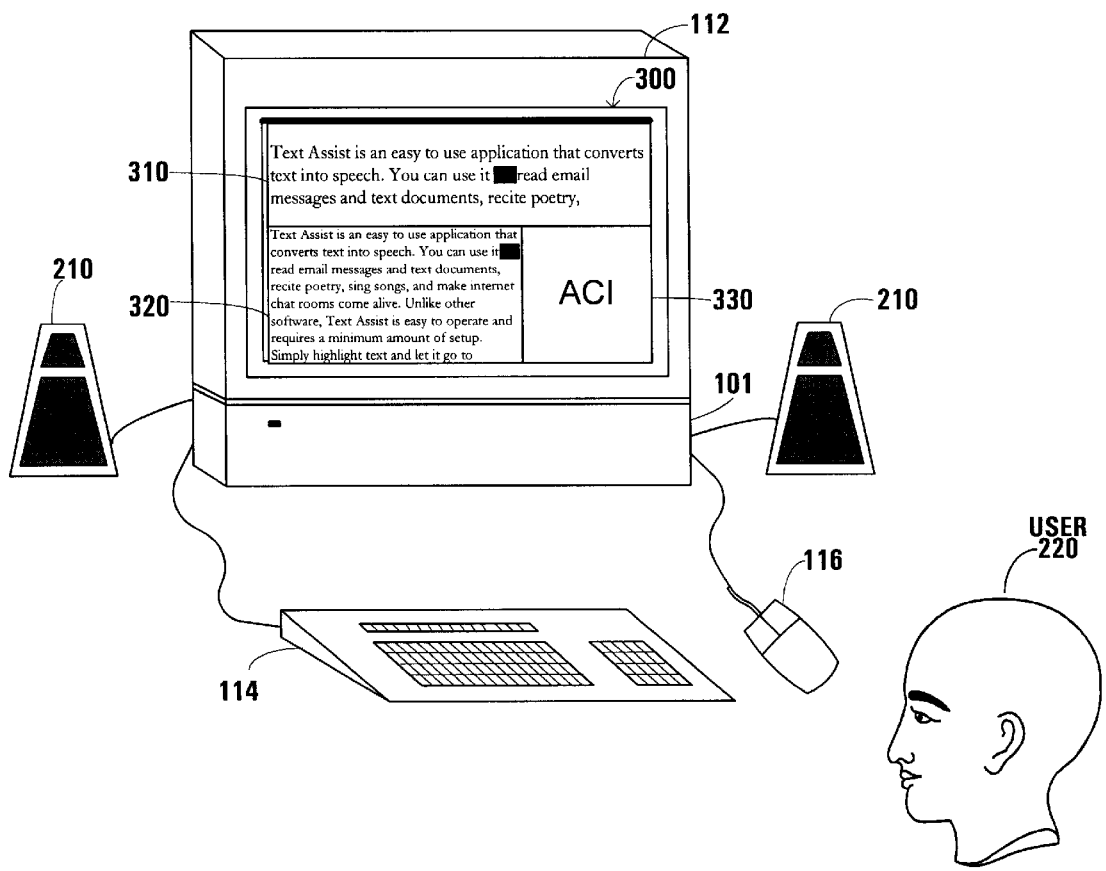
FIG. 2 illustrates a user using the exemplary computer system of FIG. 1 having embodied therein text-reader software in accordance with one embodiment of the present invention.

FIG. 2 illustrates a user 220 operating the exemplary computer system 101 of FIG. 1 having embodied therein the text-reader software of the present invention. According to one embodiment of the present invention, the text-reader software includes procedures, processes and steps which reside as data bits within the memory units 106, 108 and 110 of computer system 101. Also illustrated in FIG. 2 are speakers 210, alpha-numeric input device 114, cursor control device 116, display device 112, and user 220. Speakers 210, alpha-numeric input device 114, cursor control device 116, and display device 112 are all coupled to data bus 101 of the computer system 101. Also shown is an exemplary graphical user interface (GUI) 300 of the present text-reader software displayed on a screen of display device 112.

In operation, the text-reader software of the present invention accesses a source of text-based data, displays a text document in a text window 320 using a preselected standard font size, and displays a portion of the same text document in an another text window 310 using a preselected magnified font size. The text-reader software of the present invention then electronically reads the text document (or "file") aloud one word at a time through speakers 210. Significantly, the text-reader software of the present embodiment highlights each of the words as each word is electronically enunciated using a speech synthesizer. In the present embodiment, only portions of the text-based data are displayed on the text windows 310 and 320 at a time. Therefore, in the present embodiment, the text-reader software automatically displays portions of the text-based data containing the word that is currently being read aloud. Moreover, the text-reader software automatically scrolls the text-based data to display the appropriate portions in text windows 310 and 320 as the document is being automatically read.

It should be appreciated that text-to-speech technology is used to electronically enunciate the text document. Text-to-speech technology is well known in the art, and is supported by a large selection of sound cards, such as the Creative™ Sound Blaster® for the PC and any of these devices can be used as device 109. Therefore, implementation details of the text-to-speech engine of the present text-reader software are not discussed herein to avoid obscuring aspects of the present invention.

Figure 3:
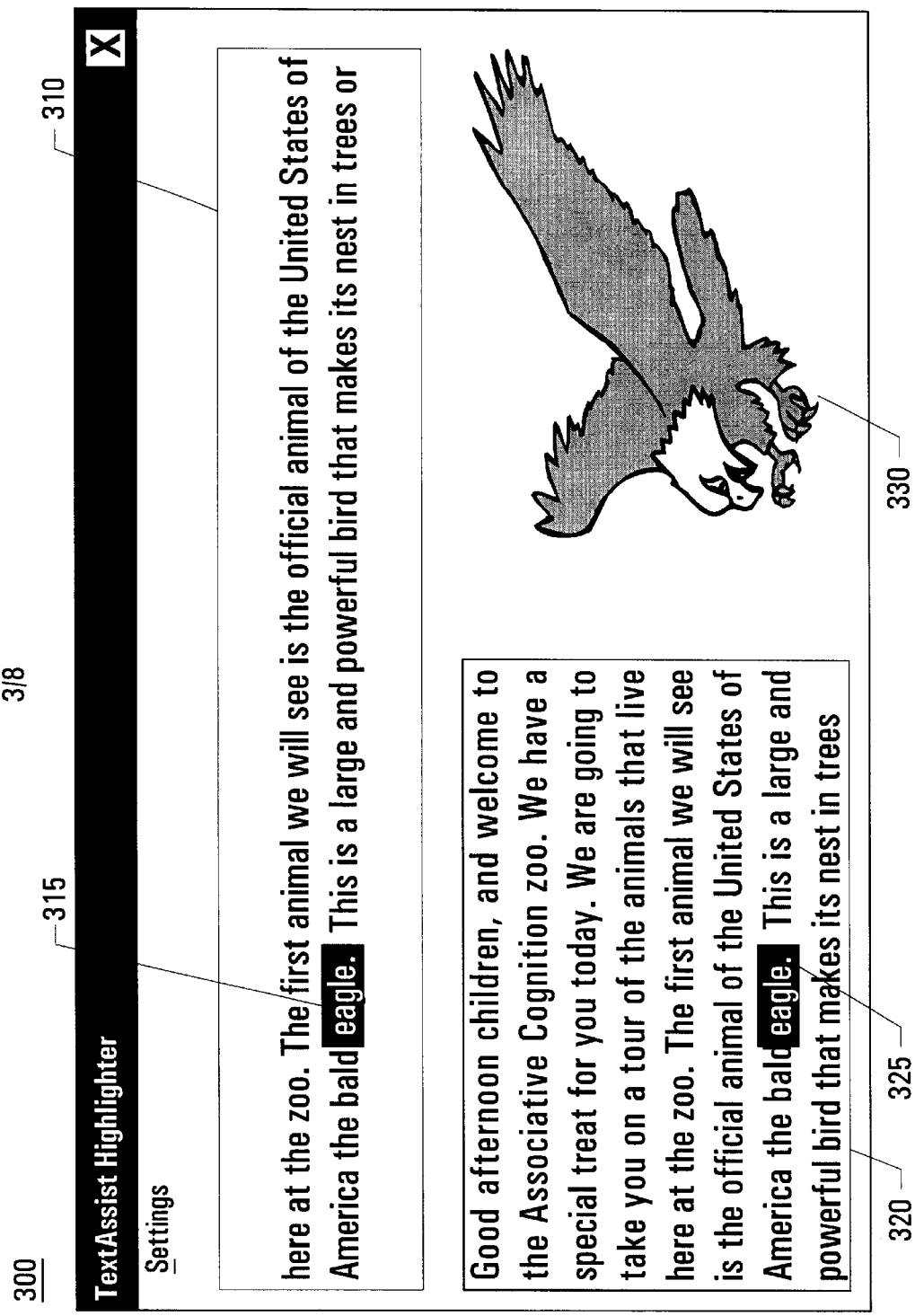
FIG. 3 illustrates screen windows for showing exemplary text-based data in an enlarged font size, in a regular font size, and graphic image data in accordance with one embodiment of the present invention.

FIG. 3 illustrates a graphical user interface (GUI) 300 of the present text-reader software in accordance with one embodiment of the present invention. Particularly, as shown in FIG. 3, GUI 300 includes a first text window 310 for showing portions of a document in an enlarged font size, a second text window 320 for showing portions of the same document in a smaller sized regular font, and a third window for showing an image descriptive of the context of the document that is currently being displayed in windows 310 and 320. Also illustrated are highlighted sections 315 and 325 of the document. It is appreciated that, generally, the portion displayed in window 310 is a subset of the portion displayed in window 320. In the present embodiment, the first text window 310 provides the user a general idea of the location of the enlarged portion of the text-based data within the document and typically displays one or more sentences of text. The enlarged font size is easier to read than the standard font size, and provides significant improvement in clarity and visibility for users with visual impairment and may display one or less sentences. Computer users without visual impairment may also benefit from this feature of the present invention because the enlarged font size reduces eye-strain of the user thereby promoting readability.

According to the present embodiment, the text-reader software allows users to customize the appearance of the GUI 300, and to select different fonts and font sizes to be displayed in the large text window. The adjustment of the appearance of the GUI 300 is performed via several control interfaces which will be described below.

In the present embodiment, the text-reader software highlights the text document one word at a time, and sequentially until all the words of the document have been highlighted. More particularly, the present text-reader software highlights the same word in both windows 310 and 320 simultaneously. For example, as shown in FIG. 3, the word "eagle" is highlighted in both windows 310 and 320. According to the present invention, the same word in both windows 310 and 320 are highlighted simultaneously so that the user 220 is able to get a general idea of the location of the highlighted word in relation to the whole document. Scrolling of the portions displayed in window 310 and window 320 is automatically performed in synchronization with the highlighting.

In the embodiment as shown, highlighting is performed at the same rate as the performance of the synthesized speech. In addition, highlighting is used to distinguish the currently enunciated word from the rest of the text document. However, it should be appreciated that other methods of marking the document, such as underlining, bold-facing, coloring, etc., may also be used to distinguish the currently enunciated word from the rest of the document. Further, it should be appreciated that, in other embodiments, the text-reader software of the present invention may also mark the document one phrase at a time or one sentence at a time.

In the particular embodiment as illustrated in FIG. 3, the text-reader software of the present invention also provides a window 330 for displaying images corresponding to the context of the words (or phrases) that are being electronically enunciated and highlighted. This provides content specific display of images in window 330. In this way, by simultaneously reinforcing the information via multiple media channels, text-based information will be presented to a user in an easily comprehensible manner. As illustrated in FIG. 3, the image of an eagle is displayed in window 330 when the word "eagle" is encountered by the present text-reader software. In the present embodiment, the image is stored in a bitmap file in the memory units 106, 108 and 110 of computer system 101. Further, according to the present embodiment, the image remains displayed in the window 330 until it is replaced by another image.

In furtherance of another embodiment of the present invention, an animated sequence or a video clip corresponding to the context of the words or phrases that are being electronically enunciated may be displayed in window 330. An audio file corresponding to the context of the words or phrases that are being electronically enunciated may also be played. Sound effects that relate to the context of the words or phrases may also be generated by a sound effects engine. For instance, in the present embodiment, when the word "eagle" is highlighted, sound effects that imitate the shrieking of an eagle may be generated. In that embodiment, a configuration file may be used to store a list of keywords that triggers the display of the animated sequence or video clip, or the playback of the audio file, or the generation of the appropriate sound effects.

In one embodiment of the present invention, the source of text-based data is a data file as stored in the clipboard. The clipboard is a special memory resource maintained by window-style operating systems such as the Windows™ operating system, and the MacOS™ operating system. The clipboard stores a copy of the last information that was "copied" or "cut" from an application program such as Microsoft® Word™, or any of a number of well known programs that allow posting to the clipboard. The clipboard allows information to be transferred from one application program to another, and in the present embodiment, the clipboard allows information to be transferred from an application program to the text-assist program of the present invention. In another embodiment of the present invention, the source of the document is another application program such as Microsoft® Word™ or Microsoft® Internet Explorer™. It should also be appreciated that the text-assistant software of the present invention may electronically enunciate only a selected portion of a document. For example, when a portion of a document is selected, the text-assistant software may be activated to electronically enunciate that particular portion of the document. If no particular portion is so selected, then, by default, the text-reader software reads the entire document in the manner described herein.

In furtherance of one embodiment of the present invention, the text-reader software automatically adjusts characteristics of the synthesized voice according to the context of the document. For example, the text-reader software of the present invention may determine that the document being read constitutes portions of a horror story. Based upon such determination, the text-reader software may automatically select a creaky voice to read the document. In another embodiment, the text-reader software of the present invention may adjust characteristics of the synthesized voice according to the context of the words that are being electronically enunciated. In this manner, the text-reader software of the present invention is able to convey the emotional content of the document to the user. According to this embodiment, the content of the highlighted text (e.g. word or phrase) may cause changes in the synthesized voice's inflection, tone, speed, or volume, etc.

According to one embodiment, the synthesized speech signals may be selectively rendered from one of the speakers 210 according to a context of the text-based data that is being electronically enunciated. In this way, the synthesized speech signals are perceived by a user as directional. That is, the user may perceive that the synthesized speech originates to his left side or his right side. In another embodiment, the synthesized speech signals are rendered in such a way that a user will perceive the synthesized speech signals are three-dimensional using well known three-dimensional sound technology.

In another embodiment of the present invention, parameters of the text-reader software, such as the size of the font, the color of the highlighted text, the volume of the synthesized speech, etc., can be adjusted or customized by a user. In addition, in one embodiment of the present invention, the text-reader software may be customized to underline or boldface the words that are being electronically enunciated to suit the user's personal taste and preference. Details of the customization of various parameters of the present text-reader software will be discussed below.

Figure 4:
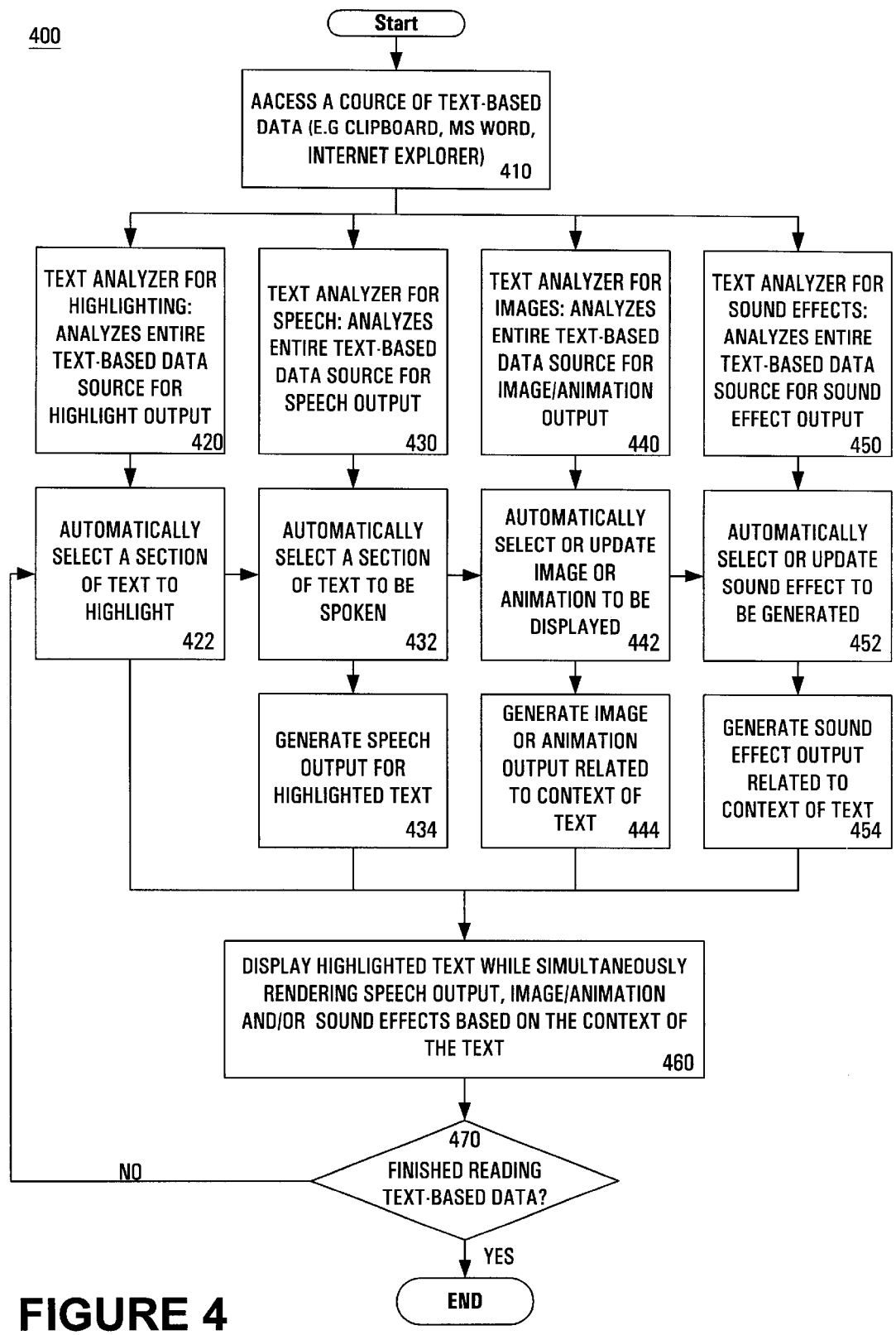
FIG. 4 is a flow diagram illustrating steps of the process of providing reading assistance to a computer user in accordance with one embodiment of the present invention.

FIG. 4 is a flow diagram 400 illustrating steps of the process of providing text assistance to a computer user in accordance with one embodiment of the present invention. In the present embodiment, the process of providing reading assistance is implemented in the form of a text-reader software stored in computer readable memory units and executed by a processor of computer system 101.

As illustrated in FIG. 4, at step 410, the text-reader software of the present embodiment accesses a source of text-based data that is to be electronically enunciated. The text-based data is typically stored in a computer readable memory unit of computer system 101, and can exist as a computer file including ASCII coded characters. In the present embodiment, the source of text-based data is the clipboard. That is, a user may select particular sentences or paragraphs from another resident document, and then "copy" the selected sentences or paragraphs into the clipboard using well known software functions. In other embodiments, the text-reader software may directly and automatically retrieve text-based data from an application software such as Microsoft® Word™ or Microsoft® Internet Explorer™ if the text-based data originates from the Internet. It should be appreciated that other application programs, particularly those which support the clipboard function, may also be used as the source of text-based data. Also, at step 410, the process determines which part of the source document to read. This part would be the highlighted part, but as a default the entire document is read if there is no highlighted part.

At step 420, the text-reader software of the present embodiment analyzes the entire text-based data source in preparation for highlighting portions of the text-based data. In this embodiment, text-reader software analyzes the entire text-based data source to determine its context, and may then automatically alter its highlighting parameters (e.g. highlighting style, foreground color, etc.) according to the context of the text-based data. For example, if the text-reader software determines that the text-based data constitutes a poem, then the text-reader software may automatically switch from word-by-word highlighting to phrase-by-phrase highlighting.

At step 422, the text-reader software of the present invention automatically selects a section of the text-based data to highlight. In the present embodiment, the text-based data is selected one word at a time. However, in another embodiment, the text-based data may be selected one phrase at a time or one sentence at a time, or a mixture of all of the above.

Synchronous with step 420, at step 430, the text-reader software analyzes the entire text-based data in preparation for generating speech output. In this embodiment, text-reader software analyzes the entire text-based data source to determine its context, and may then automatically alter its speech parameters (e.g. voice type, tone, pitch, etc.) according to the context. For example, if the text-reader software determines that the entire text-based data source constitutes a horror story, then the text-reader software will automatically select a creaky voice to create an eerie mood.

At step 432, the text-reader software of the present invention automatically selects a section of the text-based data to be spoken. In the present embodiment, step 432 is performed in synchronism with step 422. Further, in the present embodiment, the same section that is selected for highlighting would be selected for enunciation.

At step 434, the text-reader software generates synthesized speech signals for the selected section of the text-based data. In the present embodiment, the synthesized speech signals are generated according to the speech parameters determined earlier at step 430. As described above, text-to-speech technology is well known in the art, and therefore, it is not described herein to avoid unnecessarily obscuring aspects of the present invention.

Synchronous with step 420, at step 440, the text-reader software analyzes the entire text-based data in preparation for generating image outputs for the text-based data. In this embodiment, text-reader software analyzes the entire text-based data source to determine its context, and may then automatically determine the image or animation sequences to be displayed accordingly. For example, the text-reader software may determine that the text-based data pertains to a horror story, and that a particular set of images or animation sequences pertinent to horror stories will be used by default.

At step 442, the text-reader software of the present invention automatically selects an image or animation sequence to be displayed. In the present embodiment, step 442 is performed in synchronism with step 422. Further, in the present embodiment, the text-reader software selects an image or animation sequence that relates to the context of the selected section of the text-based data. In the present embodiment, the image or animation sequence is selected according to a keywords and rules database, which will be discussed in detail below.

At step 444, the text-reader software generates the image or animation sequence that relates to the context of the selected section of the text-based data. In the present embodiment, the image or animation sequence may be generated from image files stored within computer memories units of computer system 101, or may be generated on the fly by a graphics engine.

Synchronous with the step 420, at step 450, the text-reader software analyzes the entire text-based data in preparation for generating sound effects for the text-based data. In this embodiment, text-reader software analyzes the entire text-based data source to determine its context, and may then automatically determine an appropriate set of sound effects to be generated for the text-based data according to its context.

At step 452, the text-reader software of the present invention automatically selects sound effects to be generated. In the present embodiment, step 452 is performed in synchronism with step 422. Further, the text-reader software selects the appropriate sound effects that relate to the context of the selected section of the text-based data. According to the present embodiment, the appropriate sound effects are selected from the keywords and rules database detailed below.

At step 454, the text-reader software generates the audio signals that relate to the context of the selected section of the text-based data. Audio signals generation are well known in the art, and is therefore not described herein to avoid obscuring aspects of the present invention.

At step 460, the text-reader software highlights the selected section of the text-based data. Significantly, according to that embodiment, the synthesized speech signals and the audio signals are rendered audible with the highlighting of the selected text. In addition, images that pertain to the highlighted text are simultaneously displayed. For example, with reference to the exemplary GUI 300 of FIG. 3, portions of the text-based data are displayed in windows 310 and 320. Further, in the embodiment as illustrated in FIG. 3, the word "eagle" is selected and highlighted in both windows 310 and 320. Synthesized speech signals enunciating the word "eagle" and sound effects imitating the shrieking of an eagle are rendered audible to the user 220 synchronously with the highlighting of the word "eagle". An image depicting an eagle is displayed in window 330 synchronously with the highlighting of the word "eagle". In this way, the user 220 can perceive text-based data via multiple data channels (e.g. visual text, visual image, spoken word or phrase, and sound effects).

With reference still to FIG. 4, at step 470, the text-reader software determines whether all the words in the selected portion of the document have been read aloud. If it is determined that all the words have been read aloud, or if it is determined that a user has stopped the text-reader software, the process 400 returns. Otherwise, the text-reader software automatically selects a next section of the document (e.g. next word or next phrase), and the process is repeated.

It is appreciated that the speed of the synthesized speech of step 434 typically dictates the speed of which the loop of process 400 flows. The faster the speech, the faster the words and phrases and corresponding images are highlighted and displayed, respectively.

Keywords and Rules Database

In the present embodiment, the text-reader software scans a predefined database that contains a list of keywords or key phrases and the names of the images to be displayed therewith, and audio or sound effects to be played when the corresponding keywords or key phrases are encountered in a document. In the present embodiment, the database may be defined by a user. A sample database is given in the following.

Sample Database

// TextAssist Sample Database
// Format description:
// keyword, *.bmp,*.wav
// (multiple filenames display multiple bitmaps or audio files)
// Pictures
eagle, eagle.bmp
Frank, frank.bmp
Parrot, parrot.bmp
// Pictures and Music
engine, engine.bmp, engine.wav
// Animated Sequence
creative, creative1.bmp, creative2.bmp, creative3.bmp In the present embodiment, the text-reader software is capable of displaying bitmap files (.bmp files) and playing audio files (.wav files) when keywords are encountered in a document. For example, as shown in the sample database above, and as illustrated in the GUI 300 of FIG. 3, when the word "eagle" is encountered in the document, an image representing the bitmap file "eagle.bmp" is displayed in the image window 330. According to the present embodiment, the image window 330 continues to display the image until a next keyword is encountered. Similarly, when the keyword "Frank" is encountered, the image file "frank.bmp" will be displayed, and when the keyword "parrot" is encountered, the image file "parrot.bmp" will be displayed.

In the present embodiment, the text-reader software is also capable of playing an audio file when an associated keyword is encountered. Further, the text-reader software may display an image file and play an audio file if both the image file and the audio file are associated with a certain keyword. As shown in the sample database, the keyword "engine" is associated with an image file "engine.bmp" and an audio file "engine.wav." The text-reader software, after parsing the sample database, will display the image file and play the audio file whenever the keyword "engine" is encountered.

Further, according to the present embodiment, the text-reader software is capable of displaying an animated sequence. As shown in the sample database, the keyword "creative" is associated with several image files "creative1.bmp," "creative2.bmp," and "creative3.bmp."
The text-reader software of the present embodiment, after parsing the sample database, will display the image files as an animated sequence whenever the keyword "creative" is encountered.

It should be appreciated that, in another embodiment of the present invention, natural language processing (NLP) rules may also be included in the database. In that embodiment, NLP rules are used to define more sophisticated relationships between the context of the text-based data and the images to be displayed and the audio or sound effects to be played back. Natural language processing is well known in the art. Therefore, implementation details of the text-reader software of the present invention is not discussed herein to avoid obscuring aspects of the present invention.

It should also be appreciated that the images, animation, and audio or sound effects that are displayed or made audible may be generated on-the-fly by a graphics and/or sound effects engine. In that embodiment, the images, animation, audio or sound effects do not originate from a file, but from the aforementioned engine or engines. Image and sound generation is well known in the art. Therefore, implementation details of the text-reader software of the present invention is not discussed herein to avoid obscuring aspects of the present invention.

Figure 5A:
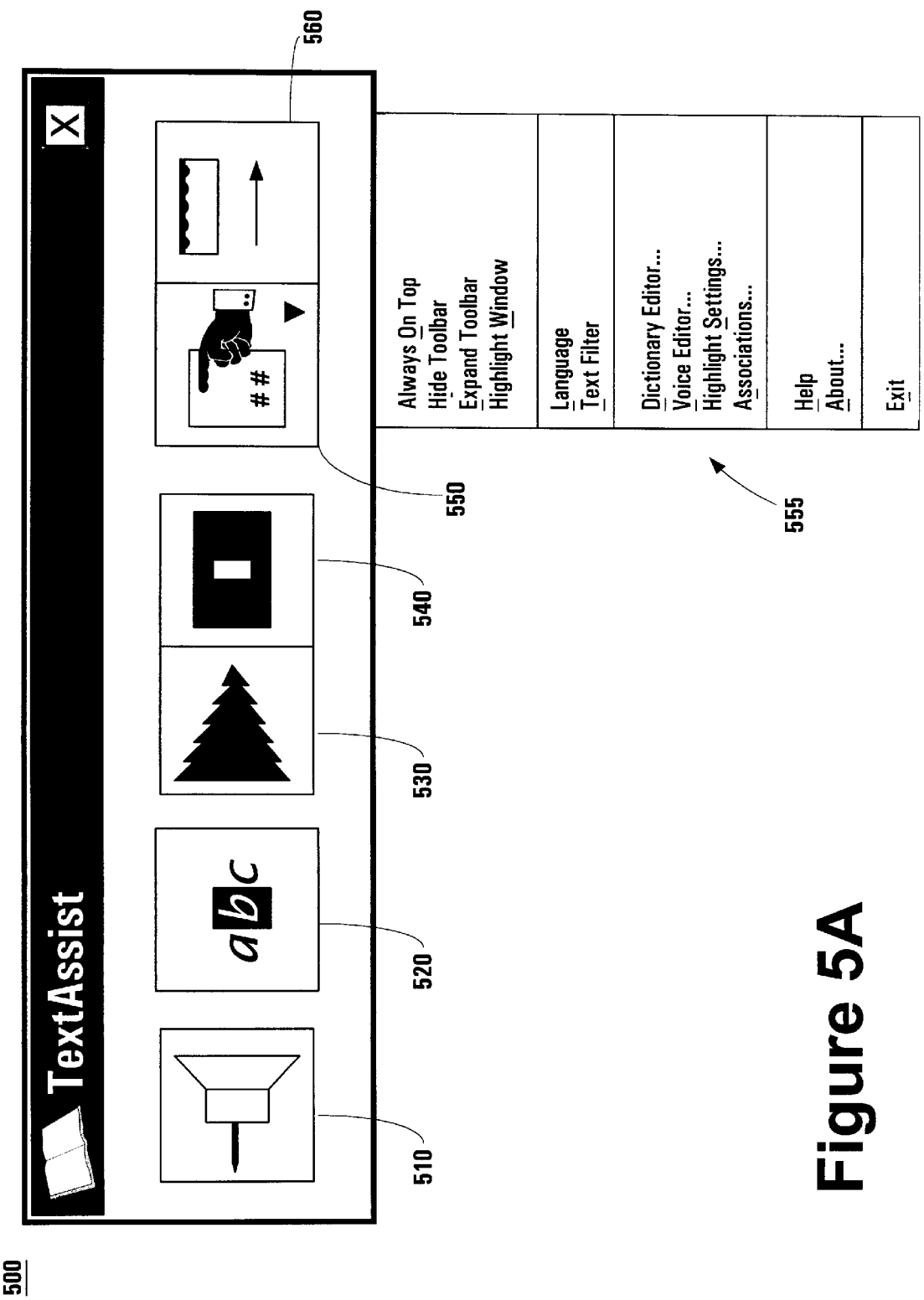
FIG. 5A illustrates a graphical user interface including a toolbar that is used for controlling, customizing, and setting up various operations of the reading assistant software in accordance with one embodiment of the present invention.

Control and Configuration of the Text-Reader Software of the Present Invention FIG. 5A illustrates a graphical user interface including a toolbar 500 through which the user 220 may control and customize aspects of the text-reader software of the present invention. In the present embodiment, the toolbar 500 is displayed on display screen 112 whenever the text-reader software is executed. Further, according to the present embodiment, the user 220 may activate/deactivate the highlighter feature of the present text-reader software by a mouse click on "highlight window" button 520. Particularly, when the highlighter feature is deactivated, the procedures for displaying the text-based data that is being electronically enunciated and the procedures for highlighting the words synchronously with the enunciation will be disabled. However, in the present embodiment, other functions of the text-reader software are unaffected even when the highlighter is deactivated. For instance, text-based data may still be electronically enunciated when the play/stop button 530 is clicked.

As further shown in FIG. 5A, the toolbar 500 also includes a pause button 540 for pausing/resuming the enunciation of the text-based data, and an "always-on-top" button 510, which, when selected, forces the toolbar 500 to be displayed regardless of the state or display items of other currently active application programs. In addition, the toolbar 500 includes a menu button 550. A mouse click on the menu button 550 will pop up a menu window 555. The menu window 555 contains commands which may be selected by scrolling down and clicking on the desired command. As an example, a user may choose to deactivate the highlighter feature of the present text-reader software. In that event, the user may click on button 520, or may click on button 550 to bring out menu 555, and then scroll down the menu 555 to the "Highlight Window" command to de-select the highlight feature. The toolbar 500 also provides an "expand/shrink" button 560, which, when selected, expand toolbar 500 to include several slider controls for controlling the parameters the speech synthesizer.

Figure 5B:
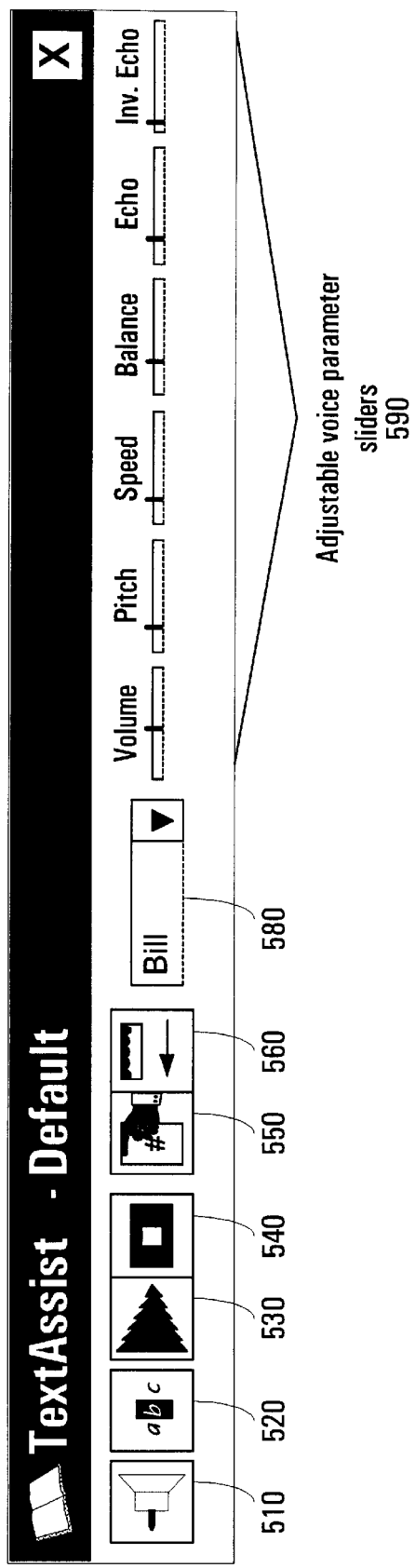
FIG. 5B illustrates a graphical user interface including an expanded toolbar in accordance with one embodiment of the present invention.

FIG. 5B illustrates a graphical user interface including an expanded toolbar 570 according to one embodiment of the present invention. As illustrated, the toolbar 570 includes an "always-on-top" button 510, a "highlight window" button 520, a "play/stop" button 530, a "pause/resume" button 540, and an "expand/shrink" button 560. Significantly, expanded toolbar 570 includes a voice selector 580. In the present embodiment, the text-reader software includes a number of different voices which are used in reading the text-based data. For instance, the text-reader software includes a male voice named "Bill" and a female voice named "Jane." The different voices have different voice characteristics and may be selected according to the user's taste and preference.

The toolbar 570 also includes a number of adjustable voice parameter sliders 590 for user-controlled adjusting and customizing the characteristics of he synthesized speech. As illustrated, the volume, pitch, speed, balance, and echo of the voice named "Bill" are adjustable to suit the user's taste and preference. In one embodiment of the present invention, the voice characteristics of the synthesized speech may be automatically adjusted by the present text-reader software according to the context of the document that is being electronically enunciated. In that embodiment, an indicator may be embedded within the text-document to identify the mood of the document. Then, the text-reader software of the present embodiment would then automatically adjust the voice parameters such that characteristics of the synthesized speech may fit the mood of the document. For example, a document may have embedded in it an indicator that identifies to the text-reader software the document is a horror story. Then, the text-reader software of the present embodiment will then automatically adjust the voice parameters accordingly to fit the mood of the horror story (e.g. voice volume, pitch, inflection, speed, etc.).

Figure 6:
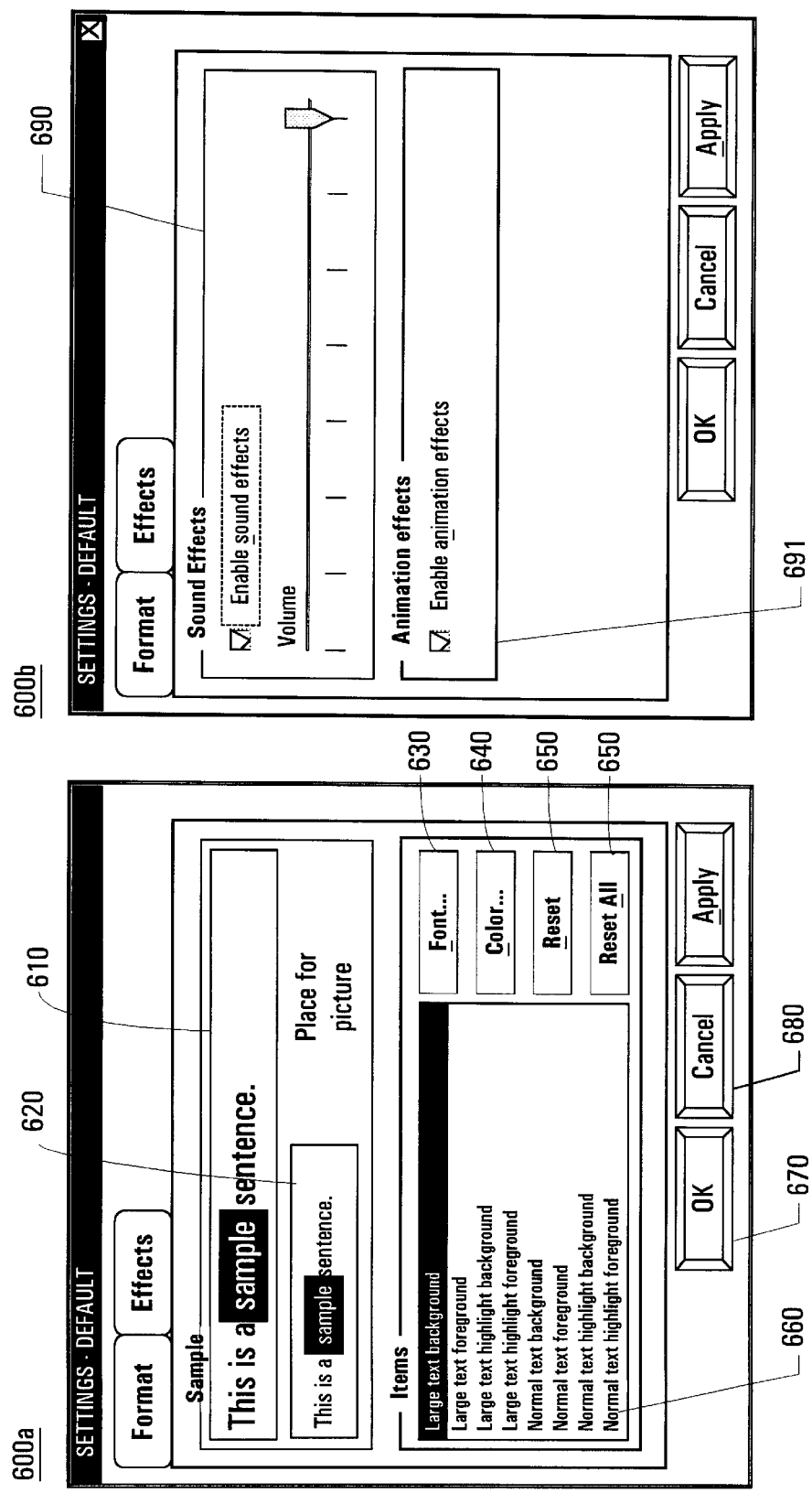
FIG. 6 illustrates a graphical user interface including a dialog box that is used for customizing the highlighting functions of the reading assistant software in accordance with one embodiment of the present invention.

FIG. 6 illustrates a graphical user interface including a dialog box 600a that is used for customizing the highlighter feature of the text-reader software in accordance with one embodiment of the present invention. In the present embodiment, dialog box 600a may be accessed by via menu button 550 of toolbar 500 and by selecting the "Highlight Settings" command on the menu 555, and by selecting the "Format" tab.

As shown in FIG. 6, dialog box 600a includes demonstration windows 610 and 620, a font-selection button 630, a color-selection button 640, reset buttons 650, an items menu 660, an "OK" button 670, and a cancel button 680. Demonstration window 610 is for displaying a sample sentence using a selected large font size, and demonstration window 620 is for displaying a sample sentence using a standard font size.

Parameters of the highlighter feature of the present text-reader software can be modified by selecting one of the items listed on the items menu 600a, and by selecting the parameter that is desired to be modified. For example, a user desiring to change the color of large font may select "Large text highlight foreground" from the items menu 660, and then click on the color-selection button 640 to choose an appropriate color according to his personal taste and preference. As another example, a user desiring to change the font type of the standard font may click on the font-selection button 630 to select an appropriate font type and size. The user may also revert his/her choices to the default settings by clicking on one of the reset buttons 650. After adjustments to the settings are made, the user may click the "OK" button to save the modifications, or the user may click the "Cancel" button to cancel his modifications.

The GUI illustrated in FIG. 6 also includes a dialog box 600b that is used for customizing the sound effects generation feature and the animation effects generation feature of the text-reader software in accordance with one embodiment of the present invention. In the present embodiment, dialog box 600b may be accessed by via menu button 550 of toolbar 500 and by selecting the "Highlight Settings" command on the menu 555, and by selecting the "Effects" tab.

As illustrated in FIG. 6, dialog box 600b includes a sound effects menu 690 and an animation effects menu 691. Sound effects menu 690 includes an "Enable sound effect" checkbox for selectively enabling and disabling the sound effects generation feature of the present text-reader software. Sound effects menu 690 also includes a slider bar for controlling the volume of the sound effects if the sound effects feature is enabled. Animation effects menu 691 includes an "Enable animation effects" checkbox for selectively enabling and disabling the animation effects feature of the present text-reader software. According to the present invention, sound effects and animation effects greatly enhance the viewing pleasure of the text-based data, and assist the users in comprehending the content of the text-based data.

Figure 7:
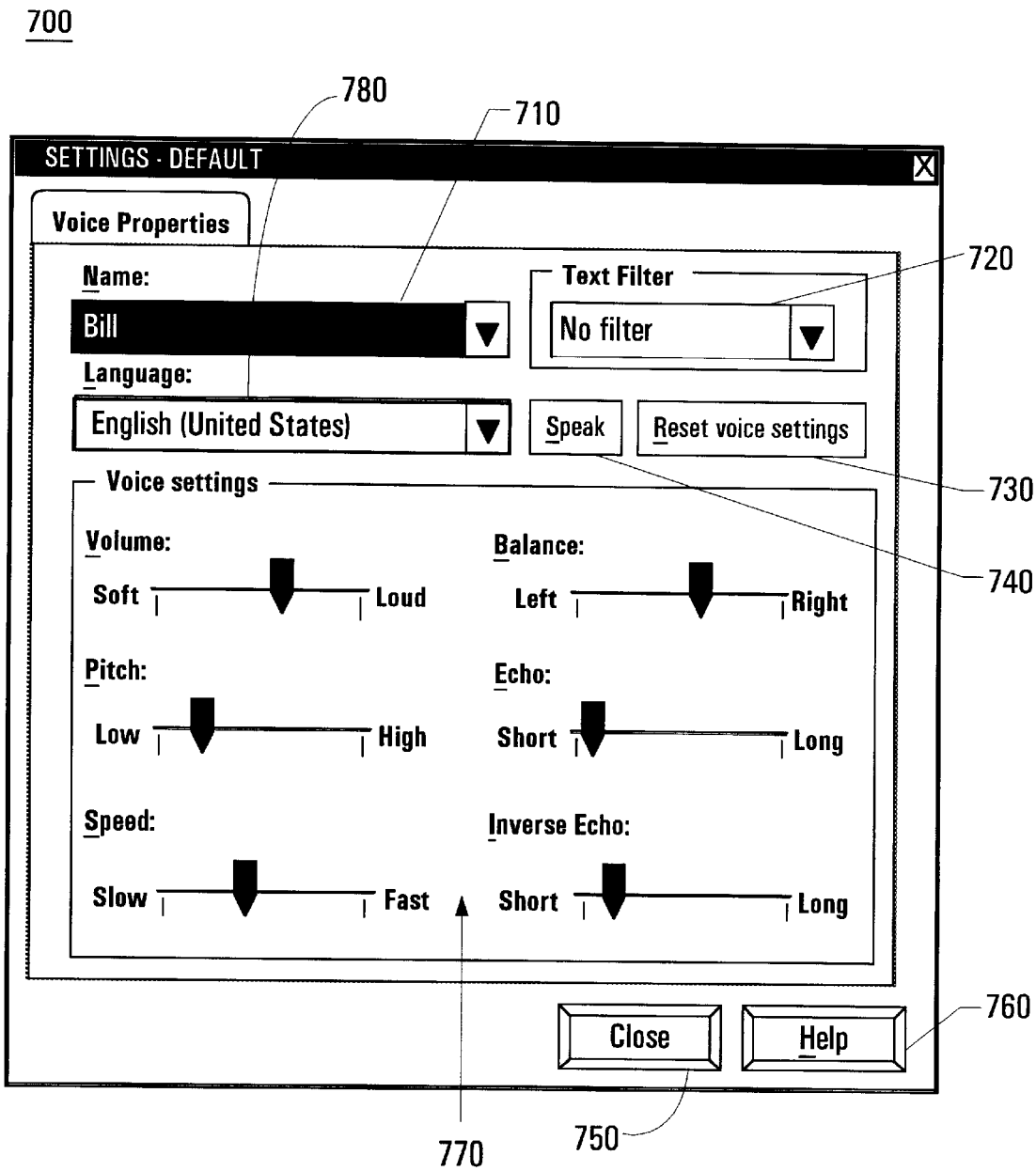
FIG. 7 illustrates a graphical user interface including a dialog box that is used for customizing the text-reader software according to one embodiment of the present invention.

FIG. 7 illustrates a graphical user interface including a default settings dialog box 700 that is used for customizing voice parameters of the text-reader software according to one embodiment of the present invention. As illustrated, default settings dialog box 700 includes a voice selector menu 710, a text filter menu 720, a reset button 730, a speak button 720, a close button 730, a help button 760 and general voice parameters controls 770. Default settings dialog box 700 also includes a language selection menu 780. Particularly, as illustrated in FIG. 7, a voice named "Bill" and English pronunciation rules are selected by default.

According to the present invention, various voice parameters of the text-reader software can be adjusted and modified via the default settings dialog box 700. For example, parameters such as volume, pitch, speed, balance, inflection and echoing effect of a voice can be modified by adjusting one of the sliders of the general voice parameters controls 770. The user may experiment with the new settings by clicking the speak button 740, and may reset the voice parameters to their default values if he so chooses.

The text-reader software of the present embodiment also includes text filters that enable it to read special kinds of documents correctly. Particularly, the text filters filter out text that should not be read aloud. For example, the e-mail text filter tells the text-reader software to disregard certain signs and symbols that are extraneous to the content of an e-mail message, and the HTML filter tells the text-reader software to ignore embedded tags in the text of an HTML document. In the default setting dialog box 700 of FIG. 7, text filters are selected by text filter selector 720.

According the present embodiment, the text-reader software supports many languages other than English. The text-reader software will attempt to read a document based on the pronunciation rules of the language selected by language selection menu 780. In one embodiment of the present invention, the text-reader software supports English, Spanish, French and German.

The present invention, a method of and apparatus for presenting textbased data via multiple media channels has thus been disclosed. The present invention is particularly useful for users with dyslexia, other reading disabilities, or visual impairment as the simultaneous reinforcement produced by the combination of reading the text-based data aloud, highlighting the words that are being read, and playing sounds and displaying imagery according to the context of the words that are being read make the information easy to perceive and comprehend. It should be appreciated that, while the present invention has been described in particular embodiments, the present invention should not be construed as limited by such embodiments, but rather construed according to the below claims.

What is claimed is:

1. In a computer system, a method of displaying text-based information so to provide text-based information reading and comprehension assistance to a user, said method comprising the computer implemented steps of:

accessing a source of text-based data;

analyzing the entire said source of text-based data and deriving context information of said entire source;

automatically adjusting visual display and audio parameters based on said context information of said entire source;

displaying a portion of said text-based data in a first text window displayed on a display screen of said computer system;

sequentially marking a section of said portion of said text-based data one section at a time and displaying said section of text-based data in a second text window displayed on said display screen, wherein said first and second text windows are displayed simultaneously;

synchronous with said step of marking, generating synthesized speech signals representative of said section of said text-based data, and rendering said speech signals audible so that text-based information and corresponding audible information are delivered to said user simultaneously;

providing a third window of said display screen for displaying images;

synchronous with said step of marking, displaying an image contextually relevant to said marked section of said text-based data in said third window such that said image can be perceived in conjunction with hearing said speech signals and seeing said section of text-based data; and generating audible sound effects synchronously with said step of marking, wherein said audible sound effects are contextually relevant to said section of said text-based data such that said audible sound effects can be perceived in conjunction with hearing said speech signals and seeing said section of said text-based data.

2. The method according to claim 1 wherein said step of displaying said section of text-based data further comprises the step of displaying said text-based data with a magnified font size compared to said first text window.

3. The method according to claim 1 wherein first text window is for displaying said text-based data with a standard font size, and wherein said second text window is for displaying said section of text-based data with a magnified font size compared to said standard font size.

4. The method according to claim 3 wherein a size of said magnified font size is adjustable by said user via a graphical user interface (GUI).

5. The method according to claim 1 wherein said step of marking further comprises the step of highlighting said section of said text-based data on said display screen.

6. The method according to claim 1 wherein said step of marking further comprises the step of underlining said section of said text-based data on said display screen.

7. The method according to claim 1 wherein said step of accessing said source of text-based data comprises the step of receiving said text-based data from a clipboard.

8. The method according to claim 1 wherein said step of accessing said source of text-based data comprises the step of receiving said text-based data from the World Wide Web.

9. The method according to claim 1 wherein voice parameters of said synthesized speech are user-adjustable via a graphical user interface (GUI).

10. The method according to claim 9 wherein said voice parameters include speed, pitch, voice type, volume, echo, balance and inverse echo.

11. The method according to claim 1 wherein voice parameters of said synthesized speech vary according to a context of said section of said text-based data.

12. The method according to claim 1 wherein said synthesized speech signals are selectively rendered from one of a plurality of speakers of said computer system according to a context of said section of said text-based data such that said synthesized speech signals are perceived by said user as directional.

13. The method according to claim 1 wherein said audible sound effects are perceived as three-dimensional by said user.

14. In a computer system, a method of displaying text-based information so to provide text-based information reading and comprehension assistance to a user, said method comprising the computer implemented steps of:

accessing a source of text-based data;

analyzing the entire said source of text-based data and deriving context information of said entire source;

automatically adjusting visual display and audio parameters based on said context information of said entire source;

displaying text-based data in a first text window displayed on a display screen of said computer system wherein said text-based data is displayed with a pre-selected font size;

displaying said text-based data in a second text window displayed on said display screen of said computer system, wherein said text-based data is displayed with a magnified font size compared to said pre-selected font size, and wherein said first text window and said second text window are displayed simultaneously;

sequentially highlighting a word of said text-based data in said second text window one word at a time;

synchronous with said step of highlighting, generating synthesized speech signals representative of said highlighted word of said text-based data and rendering said synthesized speech signals audible such that text-based information and corresponding audible information can be perceived simultaneously by said user;

providing a third window of said display screen for displaying images;

synchronous with said step of highlighting, displaying in said third window an image contextually relevant to said highlighted word such that said image is perceived by said user in conjunction with hearing said synthesized speech signals and viewing said section of said text-based data; and generating audible sound effects synchronously with said step of highlighting, wherein said audible sound effects are contextually relevant to said section of said text-based data such that said audible sound effects can be perceived in conjunction with hearing said speech signals and seeing said highlighted word of said text-based data.

15. The method according to claim 14 wherein a size of said magnified font size is adjustable by said user via a graphical user interface (GUI).

16. The method according to claim 14 wherein a color of said highlighted text-based data is adjustable by said user via a graphical user interface (GUI).

17. The method according to claim 14 wherein voice parameters of said synthesized speech signals are user-adjustable via a graphical user interface (GUI), and wherein said voice parameters include speed, pitch, voice type, volume, echo, balance and inverse echo.

18. The method according to claim 14 wherein voice parameters of said synthesized speech signals vary according to a context of said highlighted word of said text-based data.

19. The method according to claim 14 wherein said synthesized speech signals are selectively rendered from one of a plurality of speakers of said computer system according to a context of said highlighted word such that said synthesized speech signals are perceived by said user as directional.

20. The method according to claim 14 wherein said audible sound effects are perceived as three-dimensional by said user.

21. The method according to claim 14 wherein said step of accessing said source of text-based data further comprises the step of receiving said text-based data from a clipboard.

22. The method according to claim 14 wherein said step of accessing said source of text-based data further comprises the step of receiving said text-based data from the World Wide Web.

23. A computer-usable medium having computer-readable program code embodied therein for causing a computer to perform a method of displaying text-based information to a user with dyslexia, reading disabilities or vision impairment so to provide text-based information reading and comprehension assistance to said user, said method comprising the steps of:

accessing a source of text-based data;

analyzing the entire said source of text-based data and deriving context information of said entire source;

automatically adjusting visual display and audio parameters based on said context information of said entire source;

displaying text-based data in a first text window displayed on a display screen of said computer system, wherein said text-based data is displayed with a pre-selected font size;

displaying said text-based data in a second text window displayed on said display screen of said computer system, wherein said text-based data is displayed with a magnified font size compared to said pre-selected font size, and wherein said first text window and said second text window are displayed simultaneously;

sequentially highlighting a word of said text-based data in said second text window one word at a time;

synchronous with said step of highlighting, generating synthesized speech signals representative of said highlighted word of said text-based data and rendering said synthesized speech signals audible such that text-based information and corresponding audible information can be perceived simultaneously by said user;

providing a third window of said display screen for displaying images;

synchronous with said step of highlighting, displaying in said third window an image contextually relevant to said highlighted word such that said image can be perceived in conjunction with hearing said speech signals and seeing said section of text-based data; and generating audible sound effects synchronously with said step of highlighting, wherein said audible sound effects are contextually relevant to said section of said text-based data such that said audible sound effects can be perceived in conjunction with hearing said speech signals and seeing said highlighted word of said text-based data.

24. The computer-usable medium according to claim 23 wherein voice parameters of said synthesized speech signals are user-adjustable and wherein said voice parameters include speed, pitch, voice-type, volume, echo, balance and inverse echo.

25. The computer-usable medium according to claim 23 wherein voice parameters of said synthesized speech signals vary according to a context of said highlighted word of said text-based data.

26. The computer-usable medium according to claim 23 wherein said synthesized speech signals are selectively rendered from one of a plurality of speakers of said computer system according to a context of said highlighted word such that said synthesized speech signals are perceived by said user as directional.

27. The computer-usable medium according to claim 23 wherein said audible sound effects are perceived as three-dimensional by said user.

28. The computer-usable medium according to claim 23 wherein said step of accessing said source of text-based data further comprises the step of receiving said text-based data from a clipboard.

29. The computer-usable medium according to claim 23 wherein said step of accessing said source of text-based data further comprises the step of receiving said text-based data from the World Wide Web.

30. A computer-usable medium having computer-readable program code embodied therein for causing a computer to perform a method of displaying text-based information to a user with dyslexia, reading disabilities or vision impairment so to provide text-based information reading and comprehension assistance to said user, said method comprising the steps of:

accessing a source of text-based data;

analyzing the entire said source of text-based data and deriving context information of said entire source;

automatically adjusting visual display and audio parameters based on said context information of said entire source;

displaying text-based data in a text window displayed on a display screen of said computer system, wherein said text-based data is displayed with a pre-selected font size;

sequentially highlighting a word of said text-based data in said text window one word at a time;

synchronous with said step of highlighting, generating synthesized speech signals representative of said highlighted word of said text-based data and rendering said synthesized speech signals audible such that text-based information and corresponding audible information can be perceived simultaneously by said user;

providing a graphics window of said display screen for displaying images;

synchronous with said step of highlighting, displaying in said graphics window an image contextually relevant to said highlighted word of said text-based data such that said image can be perceived by said user in conjunction with hearing said speech signals and seeing said highlighted word of text-based data; and generating audible sound effects synchronously with said step of highlighting, wherein said audible sound effects are contextually relevant to said highlighted word of said text-based data such that said audible sound effects can be perceived in conjunction with hearing said speech signals and seeing said highlighted word of said text-based data.

* * * * *